Sept. 24, 1940.　　　　C. A. LANG　　　　2,216,035
LIQUID LEVEL GAUGE
Filed April 25, 1938　　　5 Sheets-Sheet 1
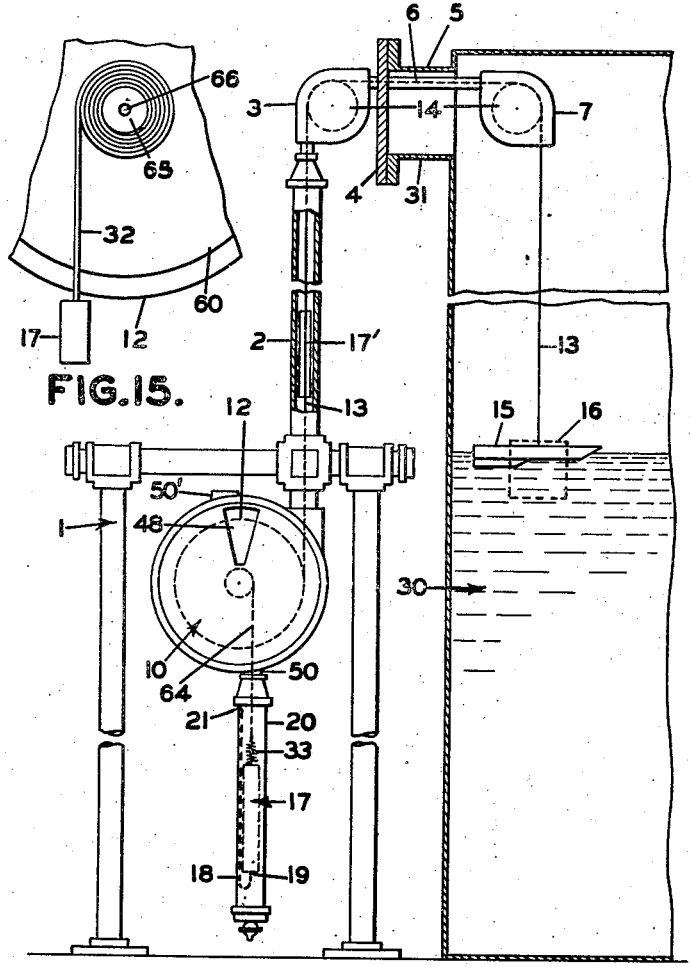
FIG.15.
FIG.1.
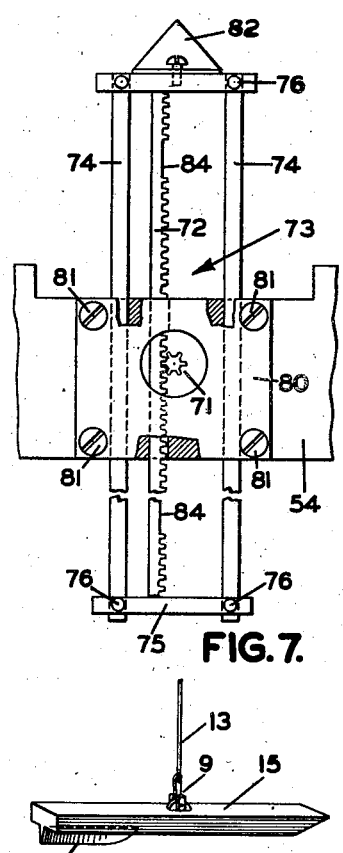
FIG.7.
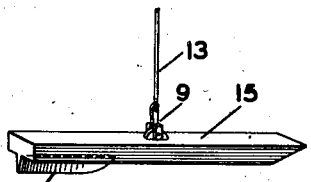
FIG.6.
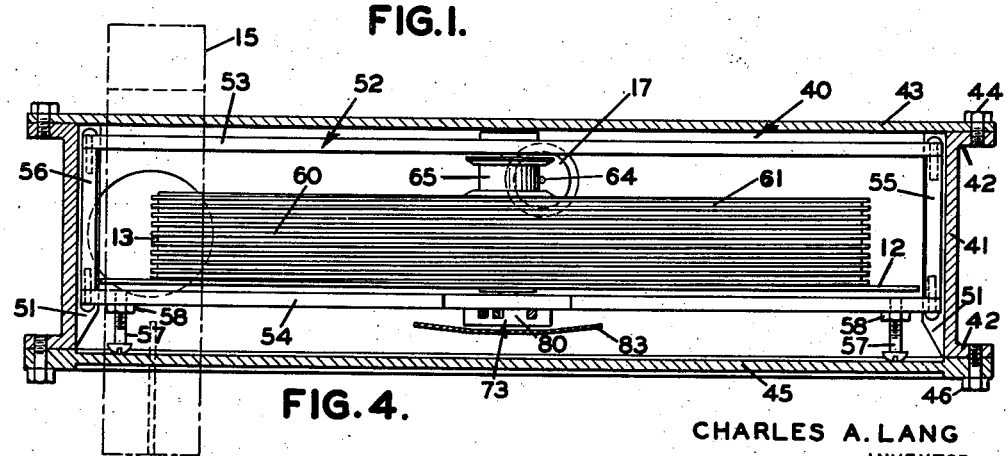
FIG.4.
CHARLES A. LANG
INVENTOR
BY
ATTORNEYS

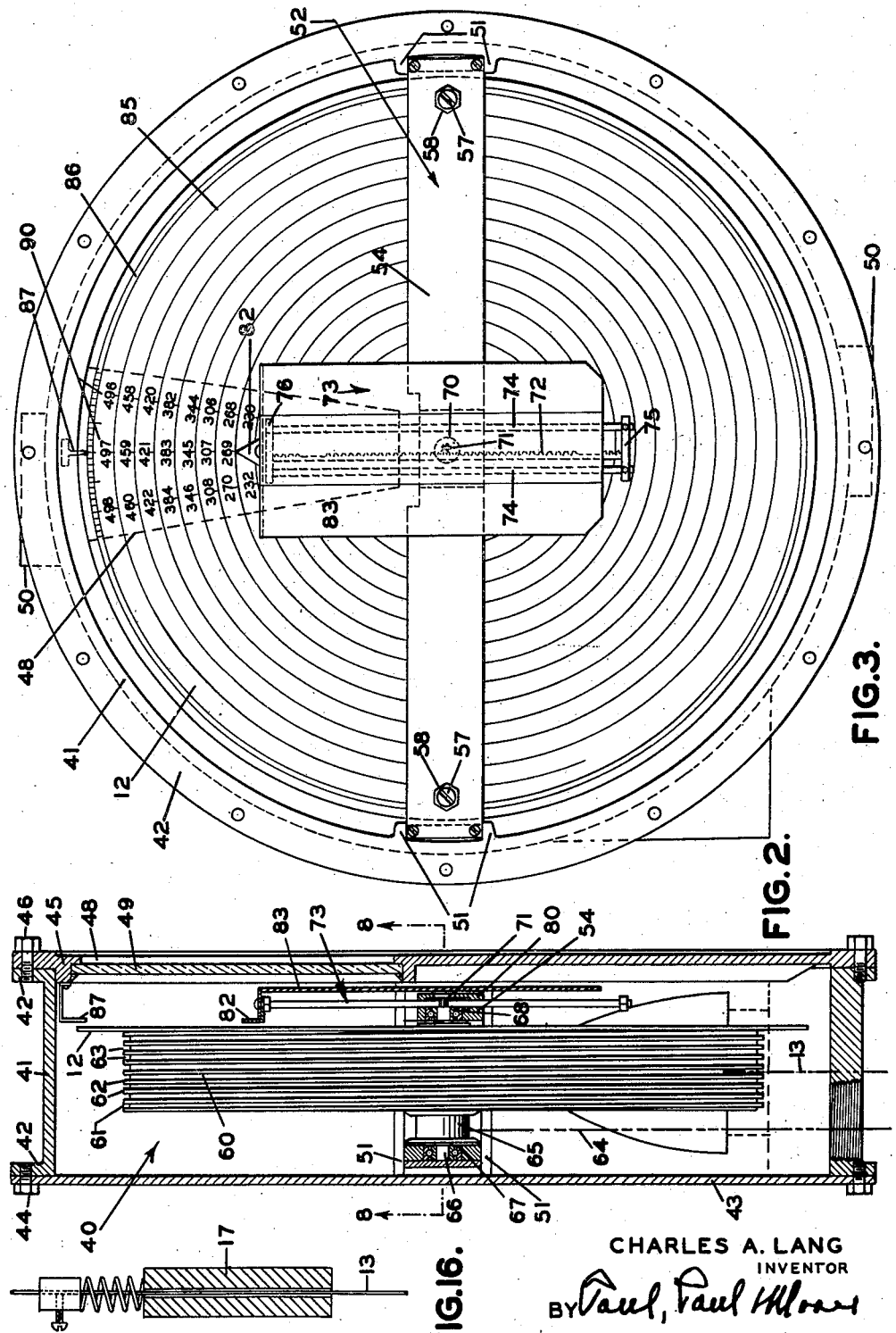

Sept. 24, 1940.  C. A. LANG  2,216,035
LIQUID LEVEL GAUGE
Filed April 25, 1938  5 Sheets-Sheet 3

CHARLES A. LANG
INVENTOR

BY

ATTORNEYS

Sept. 24, 1940.                      C. A. LANG                         2,216,035
                                  LIQUID LEVEL GAUGE
                             Filed April 25, 1938              5 Sheets-Sheet 4
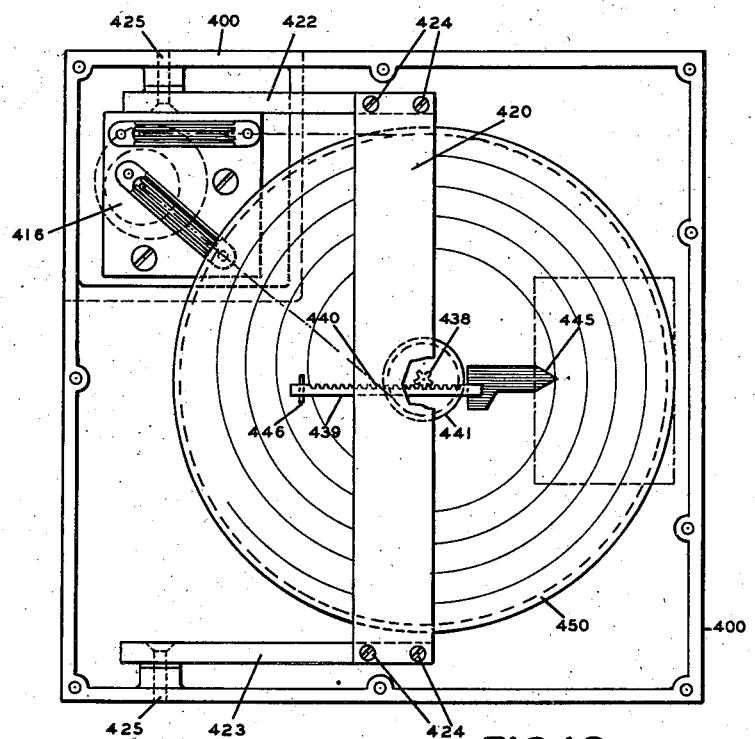
FIG.12.
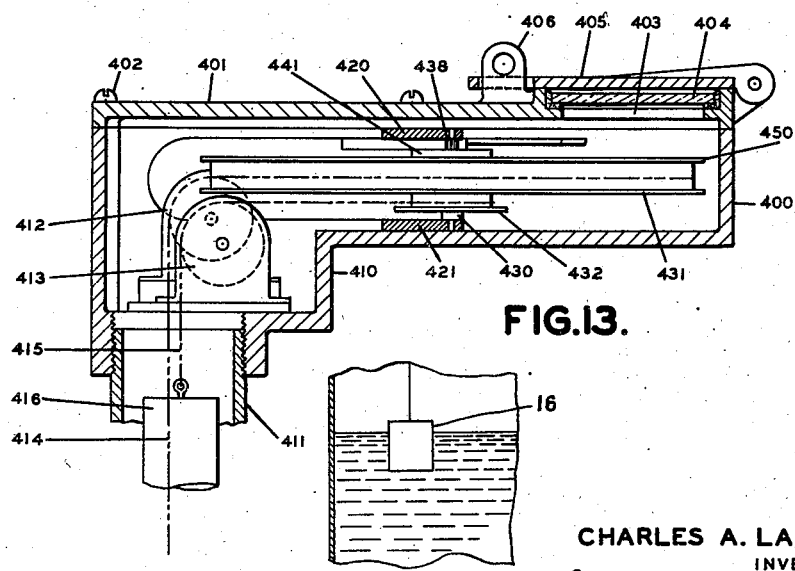
FIG.13.
FIG.1A.
CHARLES A. LANG
INVENTOR
BY Paul, Paul Moore
ATTORNEYS Sept. 24, 1940.  C. A. LANG  2,216,035
LIQUID LEVEL GAUGE
Filed April 25, 1938   5 Sheets-Sheet 5

CHARLES A. LANG
INVENTOR
BY
ATTORNEYS

Patented Sept. 24, 1940

2,216,035

UNITED STATES PATENT OFFICE 2,216,035

LIQUID LEVEL GAUGE

Charles A. Lang, Minneapolis, Minn., assignor to Langage, Inc., Minneapolis, Minn., a corporation of Minnesota Application April 25, 1938, Serial No. 204,073

15 Claims. (Cl. 73—313)

The present invention relates to liquid level measuring devices and particularly to devices which are capable of indicating relatively minute changes in the level of liquid in reservoirs in which the level varies over a wide range, such as reservoirs for the bulk storage of oil. Such reservoirs or tanks, as they are commonly designated, are frequently more than 100 feet in diameter and upwardly of 100 feet in height. Due to the large surface areas of such tanks very minute changes in the level of the oil therein represent sizeable quantities of liquid. For example, in an eighty thousand barrel capacity tank having a diameter of 120 feet and a height of 42 feet, each one-tenth inch of height represents 666 gallons, or almost sixteen barrels capacity. It has heretofore been considered impossible to measure liquid level of such tanks to within less than one-quarter of one inch and as a result the handling of liquids such as oil in bulk storage has been fraught with inaccuracies frequently totaling many thousands of barrels. Since the purchasing of oil is frequently based upon tank measurements such large discrepancies have resulted in mispayments totaling many hundreds of dollars.

It is an object of the present invention to provide a liquid level measuring device which is capable of accurately indicating changes of liquid level in the order and magnitude of one one-hundredth ($\frac{1}{100}$) inch over scale ranges from a few feet to more than one hundred feet.

In the transportation of oil and other fluids by pipe lines it is customary to provide pumping stations along the pipe line at intervals of from 20 to 30 miles. Each pumping station is ordinarily provided with a "tank farm" comprising a large number of oil storage tanks for the temporary or permanent storage of oil. During the pumping of oil into and out of storage, accurate measurements of liquid level in the tanks must constantly be made and communicated to the pump operator so as to prevent loss due to over filling and what is even more important, to prevent air being taken into the pipe line, since an air slug between columns of oil in the pipe line constitutes a possibility of "hydraulic hammering" of the oil in the line.

It has heretofore been customary to measure the liquid level in the "tank farm" by manual means such as by a tape or line, but this method has not been wholly satisfactory because (1) it is not a continuous measurement, (2) it is not an accurate measurement, and (3) because the measurement taken at any one tank had to be transmitted manually or by signaling means to a remote pump control room.

It is an object of the present invention to provide liquid level indicating means for "tank farms", refineries and the like, whereby a continuous liquid level indication may be provided in the tanks individually and also transmitted to a remote place such as the pump control room of a pipe line pump station, or to the process units in an oil refinery.

It is a further object of the invention to provide a liquid level measuring device which is very rapidly responsive to changes in liquid level and one which gives continuous accurate indications of the liquid level in the tank.

The handling of liquids such as oil into and out of bulk storage tanks frequently produces movements in the liquid which tend to move the responsive elements, and it has heretofore been customary to provide guides or braces to prevent such movement. The friction between such guides or braces and the responsive member rendered such devices inaccurate. Furthermore, any guide or brace within a tank is totally unacceptable for practical use because of the high cost of installation and the possibility of derangement in service.

It is an object of the invention to provide a freely suspended displacement member of a shape such that it will be relatively little affected by surface movements of liquids by which it is buoyed up.

It is a further object of the present invention to provide a displacement member responsive to liquid level which has a shape such that it will be relatively little affected by surface movements of liquids by which it is buoyed up, and which has a specific gravity higher than the liquid being measured.

It is also an object of the invention to provide a displacement member of a size and shape such that it may be inserted through any small hole that may be available in a tank on which the unit may be mounted.

It is also an object of the invention to provide a weighted displacement member and counterbalancing system for actuating the indicator mechanism.

It is also an object to provide primary and secondary counter-balancing members in the indicator actuating mechanism.

It is a further object of the invention to provide a direct-acting, low-energy, low-inertia indicator and to provide an indicator actuator mechanism which is proportionately capable of developing a small amount of energy. By so proportioning the indicator and actuating system, I am able to provide a mechanism which is capable of rapidly responding to changes impressed upon it.

It is also an object of the invention to provide an indicator actuator system in which the liquid displacement member is counter-balanced and in which the interconnection between the indicator and counter-balance is through a resilient member so as to provide an oscillatory system. The effect of static friction and inertia are minimized in part by this arrangement and the instrument accordingly responds to even slight variations in liquid level.

It is a further object of the invention to provide a completely balanced liquid level indicator system in which the weight of the translatable and rotative parts are continuously in balance.

It is a further object of the invention to provide a combination of parts and devices, including a liquid level responsive device cooperatively arranged for the actuation of an indicator and telemetric transmitter, all operatively associated with a remote telemetric receiver for distantly reproducing the indications.

It is a further object of the invention to provide a telemetric liquid level indicator system in which the linear motions indicative of liquid level changes are translated into proportionate rotary motion having a relatively large number of turns for movement to low liquid level to high liquid level position, and in which such rotary motion is transmitted without angular diminution to a distant receiver-indicator in which the same relatively large number of turns is indicative of liquid level changes from low level to high level. It is also an object to provide such a mechanism in which the drive mechanism is gearless and concentric.

Other and further objects of the invention are those inherent in the devices and mechanisms hereinafter described, claimed in and illustrated, and those implied by the description, claims, and by the illustrations.

The invention is illustrated with reference to the drawings in which

Figure 1 is a schematic drawing illustrating one manner of applying the instrument of a liquid storage tank.

Figure 1A shows a cylindrical displacement member.

Figure 2 is a side elevation partly in section, illustrating a preferred modification of a direct reading instrument.

Figure 3 is a front elevation partly broken away of the indicating face of the instruments shown in Figures 2, 4, 5, 9 and 10.

Figure 4 is a plan view partly in section, along the line 8—8 of Figure 2.

Figure 6 is an enlarged view of a preferred form of displacement member.

Figure 7 is an enlargement partly broken away of a portion of the indicating mechanism.

Figure 11 is an isometric view showing the application of the telemetric units of Figures 9 and 10 to a group of tanks, and a recording apparatus for the grouped telemetric receiving units.

Figure 12 is a plan view, fully in section of the modification of an invention for use especially in underground tanks.

Figure 13 is a side elevation partly in section of the modification shown in Figure 12.

Figure 15 is a schematic partial view in elevation showing a second modification of the counter-weight mechanism.

Figure 16 is a detail partly in section, showing a modified form of connection between the operating wire and direct counter-balance.

Figure 5:
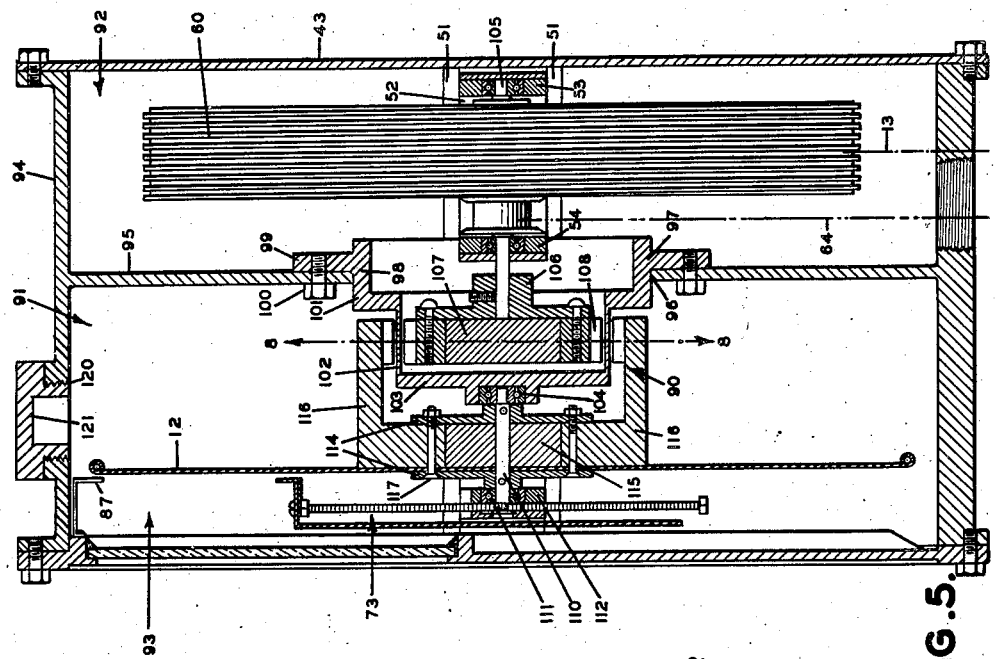
Figure 5 is a side elevation of a form of instrument used for indicating the level of liquid in vessels which are under pressure and/or vessels in which reactive, explosive or corrosive vapors are present.

A general lay-out of the present invention is is shown in Figure 1 of the drawings in which the liquid level gauge is illustrated generally at 10. In this figure the gauge is illustrated as being mounted at ground level adjacent an oil tank generally designated 30 although it is to be understood that various modifications in the mounting and location of the instrument may be made as desired to accommodate the particular type of tank on which the instrument is installed. In Figure 1 the tank is of the "balloon roof" type and is provided with a side connection 31 through which the gauge apparatus is inserted. The gauge body is supported by a framework of pipes which is generally designated 1, but it may obviously be supported in any other desired manner. Extending upwardly from the framework and gauge body is a conduit 2 which terminates at a pulley housing 3 outside cover plate 4 on tank connection 5. Another conduit 6 passes through the cover plate 4 and is welded or otherwise mounted in pressure-tight relation on the plate. Inside the tank the conduit 6 terminates in a pulley housing 7 which is sufficiently small that it can be passed through tank connection 5. Other methods of mounting these conduits on the tank may obviously be used as conditions necessitate.

In general the gauge consists of an indicating dial 12 which is directly operated by a float wire 13 which runs from the instrument up through the conduit 2 and over idler pulleys 14 in housings 3 and 7 to the displacement member 15 within the tank. The idler pulleys are of light weight metal, and are mounted on precision type ball-bearings, not illustrated.

The displacement member is illustrated as being a boat-shaped object and this is the preferred form although as hereinafter explained, in installations where the surface of the liquid is extremely quiet an ordinary cylindrical displacement member 16 may be used, as illustrated in Fig. 1A.

The gauge 10 is provided with a counter-weight generally designated 17, supported by cable 64 which moves proportionately to the movement of the float. Thus, when the float is in a low liquid level position the counter-weight will be at its highest position, and when the liquid level and float 15 are at the high liquid level position the counter-weight 17 will be at its lowest position.

As illustrated at Figure 1 the counter-weight is housed in tube 20 which is attached to boss 50 of the instrument. The counter-weight casing is capped at the bottom end and may, if desired, be provided with a petcock for draining any condensate which may collect. The instrument housing, the conduit by which it is connected to the tank 30, and the counter-weight housing all form a closed system in which the mechanical elements of the system operate. The escape of vapors from the tank is thus prevented.

The counter-weight is provided with a loop chain 18 which is connected to the counter-weight at 19 and to the counter-weight casing at point 21. As the counter-weight 17 is raised it serves to support an increasing amount of chain 18 and as it is lowered the counter-weight supports less of the chain. The weight of the chain supported by the counter-weight in its uppermost position is equal to the weight of the displacement member wire 13 between the low and high positions, and the counter-weight chain 18 thus serves to compensate for the additional weight of the displacement member wire 13 when the float is in the low liquid level position. This compensation device is important in some conditions as will be explained in greater detail hereinafter.

One form of instrument of the present invention, which is the direct mechanical drive type, is illustrated in Figures 2, 3 and 4 and consists of an instrument casing generally designated 40 which is composed of an annular ring 41 having edge flanges 42. A back plate 43 is bolted to the annular ring 41 by a plurality of bolts 44, and a front plate 45 is likewise fastened to the ring 41 by a plurality of bolts 46. The front plate is provided with an opening 48 which is covered by a glass 49 and preferably pressure-tight. The opening which has the shape shown in the full lines in Figure 1 (also shown by the dotted lines in Figure 3) serves to expose a portion of indicating dial 12.

The inner surface of annular ring 41 of the housing is provided at each side with a pair of supporting lugs 51 which constitute a channel for the reception of the mechanism frame which is generally designated 52. The mechanism frame is comprised of a back cross-bar 53 and a front cross-bar 54 which are connected together and maintained in spaced relation by spacer bars 55 and 56. The spacer bars have substantially the same width as the space between supporting lugs 51 on the inside of the annular housing 41 and hence the mechanism frame can be easily moved into the instrument during assembly. The front cross-bar 54 is provided with a pair of spacer screws 57 which are threaded into the bar and provided with lock nuts 58 by which they are prevented from turning. These spacer screws 57 locate the instrument in definitely spaced relation to the front plate 45.

The indicating mechanism is supported by the mechanism frame and comprises a drum 60 on which the displacement member wire 13 is adapted to be wound, and a much smaller drum 65 on which the counter-weight supporting member 64 is adapted to be wound. Drums 60 and 61 are carried by shaft 66 which is mounted in antifriction ball bearings 67 and 68. Bearing 67 is mounted on back cross-bar 53 and bearing 68 is mounted on front cross-bar 54.

The indicating dial 12 and drums 60 and 65 are all mounted directly on the shaft 66 and dial 12 is accordingly moved with the drums as they are revolved due to changes in liquid level position. The drum 60 is provided with a groove 61 in the manner of a screw thread so that as the displacement member supporting wire 13 is taken in it will be wound in an even course across the face of the drum. The shoulders 62 between adjacent thread grooves 63 are spaced apart by a distance which is slightly greater than the diameter of the displacement member supporting wire 13 so that there is a minimum of friction between the wire and the drum as it is wound thereon.

The front cross bar 54 is provided with a central aperture 70, as shown in Figure 3, through which extends the stub end of instrument shaft 66. The end of the shaft is formed with gear teeth 71 which cooperate with a rack bar 72 on the instrument flag and pointer mechanism which is generally designated 73.

Figure 7 shows an enlarged view of the instrument flag and pointer mechanism except with the flag 83 removed. This mechanism comprises a pair of vertically spaced bars 74 and the rack bar 72. The bars 74 are connected together in parallel spaced relationship by a bottom cross-bar 75 and a top cross-bar 76. The cross-bars may be fastened to the vertical bars 74—74 in any desired manner as by rivets 76. It will be noted that rack bar 72 is not fastened to the cross-bars but is merely positioned so as to be moved up and down by them. This method of mounting permits the bar 72 to assume the best operating position with respect to the pinion 71.

Front cross-bar 54 of the instrument-carrying frame is provided with a slide block 80 which is attached to the instrument frame by screws 81 (see Figure 7). The slide block 80 is provided with three grooves to receive the vertical bars 74 and the rack bar 72, the grooves being of sufficient width and depth to accommodate the bars without binding when the slide block 80 and the mechanism are assembled on the instrument cross-bar 54. The top cross-bar of the flag and pointer mechanism carries an index pointer 82 and a flag 83 which is fastened so as to hang vertically in spaced relation to the index mechanism when assembled on the instrument cross-bar 54, as shown in Figures 2 and 4. The line of lift of the gear teeth of pinion 71 is through substantially the center of gravity of the flag and pointer mechanism. The mechanism is hence practically balanced on the gear teeth and there is accordingly a minimum amount of friction upon the grooves of slide block 80.

The rack bar is provided with upper and lower blank spaces 84—84 which define the limit of movement of the flag and pointer mechanism 73. These blank spaces in the rack bar serve to prevent the flag and pointer mechanism from being harmed if the drum is revolved beyond its normal limit of movement by excessive turning of the drum.

The indicating dial 12 is provided with a spiral marking 85 which is the line defined by the index pointer 82 upon the dial as the dial and pointer mechanism move from the low liquid level position to the high liquid level position. The indicating dial is also provided with a circle 86 of fractional indicia adjacent which there is mounted a pointer 87 which may for convenience be attached to the front housing plate 45. It will be noted that the circle 86 of fractional indicia has a greater diameter than the drum 60 and hence the actual distances between adjacent fractional indicia marks on the circle 86 are greater than the increments of liquid level change which they may represent.

Typical dial graduations are shown on Figure 3 as they appear through opening 48 in front housing plate 45. Although Figure 3 is a view with the front cover removed, all of the dial markings except those just mentioned have been omitted so as to avoid confusion of the drawings.

The instrument provides three indications of liquid level, as follows:

*First.*—The flag 83 which operates behind window 48 of the housing serves as a general indication of the liquid level. The flag 83 is preferably painted a distinct color such as Chinese red, whereas the instrument is generally painted with aluminum pigmented paint, and the position of the flag 83 behind the opening is, therefore, clearly visible at a considerable distance and serves to denote generally whether the liquid level is low or about medium full, or full.

*Second.*—The pointer 82 which moves in juxtaposition to the spiral 85 of unit indicia affords a fine unit graduation of the liquid levels being measured. The total length of the spiral 85 is of substantially the same order and magnitude as the distance the displacement member moves from low level to high level condition for the turns which are of larger diameter than the drum compensate for the turns which are of smaller diameter. Thus, by noting the position of pointer 82 over the unit indicia of spiral 85 there is obtained accurate readings in units of the liquid level being measured.

*Third.*—The pointer 87 which operates in juxtaposition to the circle 86 of fractional indicia in conjunction with pointer 82 affords a decimal reading of the liquid level. The distances between consecutive radial lines 90 at the diameter 86 is preferably divided into ten spaces and thus the pointer 87 and dial 86 afford a reading in tenths of the unit reading afforded by pointer 82. Since the distance along the circumference of circle 86 between the radii of successive units is greater than the change in liquid level actually being measured, the accuracy of the instrument is considerably enhanced. Readings of the order and magnitude of 1/100 of an inch of liquid level change can be made upon a dial of approximately twelve inches in diameter when the instrument is directly connected to a displacement member, and this degree of accuracy is maintained throughout the entire range of liquid level change, which may be from a few feet to more than one hundred feet. This feature of accuracy results from the combination of the gearless concentric driving mechanism with the concentric indicating mechanism. By this combination the motion of the displacement member is transmitted as a unit function through the mechanical driving mechanism, and is repeated as substantially a unit function in the indicator side of the instrument.

*Pressure and corrosion-resistant instrument*

In Figure 5 there is illustrated an instrument which is adapted to be used for the measurement of the level of liquid in tanks where the liquid is maintained under pressure or where corrosive fumes are evolved by the liquid, which accordingly must be kept in a closed vessel. In this instrument the drum 60 is housed separately from the indicating dial 12 and the two are maintained in predetermined angular relation with respect to each other by means of a magnetic coupling which is generally designated 90.

The instrument comprises a housing generally designated 91 which has a high pressure or corrosion-resistant chamber 92 and an instrument chamber 93. The housing consists of an annular member 94 which has a central partition 95. The central partition 95 has an opening 96 which receives the sealing member which is generally designated 97 of the magnetic coupling 90.

The member 97 comprises an annular ring 98 having an outer flange 99 by which it is bolted to the central partition 95 by means of bolts 100. The annular ring 98 also has an inwardly extending flange 101 which carries a cylindrical shell 102 of non-magnetic material. The cylindrical shell is closed at the end by a thick wall 103 which forms the support for bearing 104 of instrument shaft 110. The drum shaft 105 is, as in the previous modification, supported by precision ball bearings mounted on the front and back cross-bars 53 and 54 of the mechanism frame 52. It is noted that the annular ring 98 is notched diametrically so that the cross-bar 54 may pass directly across the instrument housing.

The instrument cross-bars are carried on supporting lugs 51 on the inside of the pressure and corrosion-resistant chamber 92. The drum shaft 105 extends through the instrument frame member 54 and carries a flange 106 upon which is mounted a block 107 of permanently magnetized material. Pole pieces 108 of soft iron are also attached to flange 106 and are provided with a number of teeth, as shown in Figure 8, for a purpose to be described.

The indicator dial shaft 110 is mounted in a pair of ball bearings 104 and 111, the former being carried by the thick wall 103 and the latter by the instrument cross-bar 112. The indicator dial cross-bar 112 is exactly analogous to instrument cross-bar 54 of the previously described modification (Figures 2, 3 and 7) and carries an identical flag and pointer mechanism which is generally designated 73, which will not be further described.

The shaft 110 is provided with a pair of flanges 114 between which are carried a block of magnetic material 115, pole pieces 116 and the instrument dial 12 which are assembled between the flanges and held in fixed relation to each other by a plurality of bolts 117. The instrument chamber 93 is provided with an opening 120 which is ordinarily closed by a screw plug 121.

Figure 8:
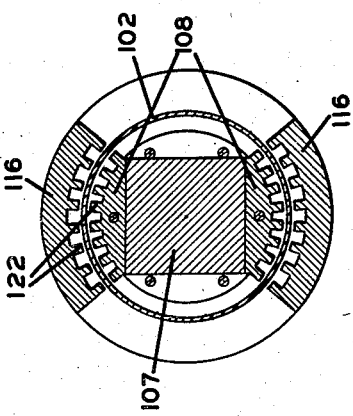
Figure 8 is a sectional detail along the line 8—8 of Figure 5.

As shown in Figure 8, the pole pieces 116 of the instrument end of the magnetic coupling 90 and the pole pieces 108 of the drum-drive end of the magnetic coupling are provided with a plurality of teeth 122 which serve to concentrate the magnetic flux across adjacent pole pieces. The number of teeth 122 is preferably considerably greater than the number of pole pieces so that the restoring force tending to pull the pole pieces and teeth into alignment will be large even when the displacement of magnet 107 with respect to pole pieces 116 is only a portion of the width of a tooth 122 on the pole piece.

The operation of the instrument shown in Figure 5 is identical with that illustrated in Figures 2, 3 and 4 except that in the instrument of Figure 5 a very high pressure may be maintained in the pressure or corrosion-resistant mechanism chamber 92 without deleterious effect on the indicating instrument which is disposed in the instrument chamber 93. The walls 94, 95, and back plate 43 are made of any desired thickness and the cylindrical shell 102 though thin will withstand considerable pressure. For instance, for the storage of liquid propane it is necessary to maintain a pressure of approximately 240 pounds per square inch in order to prevent loss of valuable vapors. Heretofore the only practical means of determining the liquid level of propane tanks was by means of sight plugs behind gate valves on the outside of the tank. These are cumbersome, only approximate in reading, and readings may be made only with difficulty. When the instrument shown in Figure 5 is installed for the measurement of the level of the propane in such a tank the pressure chamber 92 is accordingly made sufficiently strong to withstand the vapor pressures, and the instrument may be installed over or alongside of the tank, after the manner of installation shown in Figure 1. It is understood of course, that the tubular connections between the chamber 92 and the vessel in which the liquid is kept which serves as a conduit for the displacement member wire 13 is likewise closed throughout its length from the pressure chamber 92 to the tank and as in Figure 1, is provided with pulleys 14 within the conduit wherever the conduit direction is changed.

Where the instrument shown in Figure 5 is shown for the measurement of corrosive liquids such as raw gasoline, "sour" crude oil, or chemical liquids having corrosive properties, the chamber 92 and all of the mechanism within the chamber are constructed of corrosion-resistant materials. Thus the bearings and other moving parts may be made of nickel-chromium alloy steel or monel metal which are resistant to most corrosive agents.

Telemetric indicator

Figure 10:
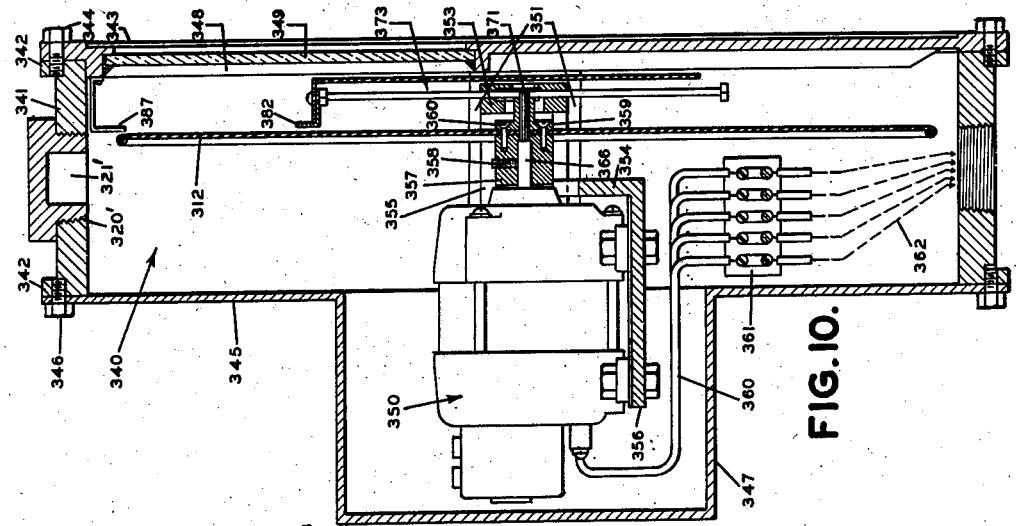
Figure 10 is a side elevation partly in section of a telemetric receiver and indicator.
Figure 9:
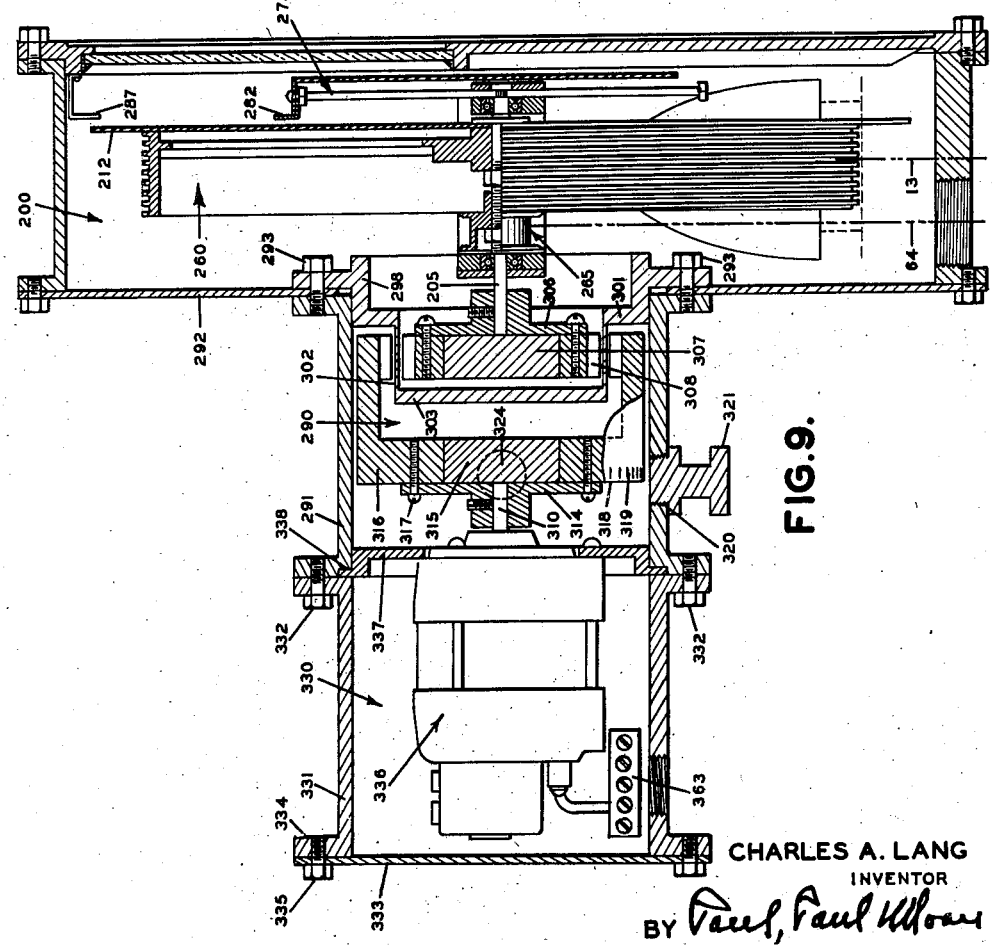
Figure 9 is a side elevation partly in section of an indicator and telemetric transmitter.

The telemetric form of instrument is illustrated in Figures 9 and 10 and comprises a combined telemetric transmitter and local instrument shown in Figure 9 and a telemetrically driven receiving instrument, shown in Figure 10.

The combined telemetric transmitter and local instrument shown in Figure 9 comprises an instrument section generally designated 200, a magnetic coupling section generally designated 290 and a telemetric transmitter section generally designated 330. The instrument section 200 is analogous to the instrument shown in Figure 2 and comprises a dial indicator 212, an operating drum generally designated 260, a flag and pointer mechanism generally designated 273, and a counter-weight drum generally designated 265. These parts will not be described further in detail since they are similar to those of the direct mechanically driven instrument shown in Figure 2 except for a slight modification necessary for the introduction of the magnetic coupling 290.

The magnetic coupling section generally designated 290 is similar to that of the instrument shown in Figure 5 and is housed in a cylindrical drum 291 which is attached to the back wall 292 of the instrument section by a plurality of studs 293 which also serves to hold in place the member 298 of the magnetic coupling 290. Member 298 is provided with an inturned flange 301 which carries the cylindrical shell 302 which is of non-magnetic material. The cylindrical shell is closed at its outer end by a thick wall 303. The shaft 205 of the instrument section is provided with a flange 306 which carries the permanent magnet 307 and pole pieces 308 of soft iron.

The telemetric transmitter section 330 is housed in a cylindrical shell 331 which is attached to the housing 291 of the magnetic coupling unit by means of studs 332. The end of the shell 331 is closed by a plate 333 which is attached to the flange 334 by means of studs 335. The transmitter 336 in itself forms no part of the present invention and may be of any approved electrically operated telemetric system in which angular motions are transmitted electrically. The transmitter 336 is supported on a plate 337 which is mounted in an annular recess 338 between the adjacent flanges of members 291 and 331.

The shaft 310 of the telemetric transmitter 336 protrudes into the housing 291 of the magnetic coupling and carries a flange 314 upon which are mounted a block of magnetic material 315 and pole pieces 316 of soft iron. This much of the magnetic coupling is identical with that previously described with reference to Figure 5.

The flange 314 also carries a cylindrical shell 318 upon which are a plurality of indicia marks 319 for a purpose to be described. The cylindrical shell 318, the pole pieces 316 and the block of magnetic material 315 are all held in assembled relation on the flange 314 by means of a plurality of bolts 317.

The housing 291 is provided with an opening 320 at the bottom, which is ordinarily closed by a screw plug 321, and is also provided with an opening 324 upon the level of shaft 310. The opening 324 is aligned with the indicia marks 319 of the shell 318 and is preferably closed by a window of glass or other clear material.

The indicia 319 on the cylindrical shell 318 corresponds with the markings on the outer turn of the spiral of unit indicia on dial 212 and serve to show when the magnetic coupling 290 is in proper alignment. By sighting through the opening 324, one of the indicia on shell 318 will be visible and should correspond to the indicia of the first spiral turn most adjacent the pointer of the first spiral turn most adjacent the pointer 287. If the indicia visible through opening 324 does not so correspond, the plug 321 is removed and the coupling turned by inserting the finger through the opening 320 until the proper indicia appears centrally through opening 324. When this occurs the mechanical coupling 290 is in proper alignment and will remain in alignment unless the instrument is severely disturbed as may occur when the exciting current to the electrical telemetric transmission system is interrupted.

The telemetric receiver instrument shown in Figure 10 comprises a housing generally designated 340, comprising an annular drum member 341 having flanges 342. A front plate 343 of the same design as that shown in Figure 2 is attached to the front flange 342 by means of studs 344. The back of the instrument is closed by a back cover 345 which is attached to the back flange 342 by means of studs 346.

The front plate 343 is provided with an opening 348 which is covered by a glass plate 349. The back cover 345 is provided with a central rearwardly extending recess 347 to receive the rearwardly extending end of the telemetric receiving instrument 350.

The inner surface of annular member 341 is provided at each side with a pair of supporting lugs 351 similar to those shown at 51 of the modification shown in Figure 3. The receiving instrument is supported from these lugs on a framework consisting of a front cross-bar 353 and a back cross-bar 354. The front and back cross-bars are attached at each end by a spacer bar 355 only one of which is shown in Figure 10. The back cross-bar of the instrument frame includes a central rearwardly extending platform 356 which forms a support for the telemetric receiving instrument 350.

The receiving instrument dial 312 is mounted on a hub 357 which is in turn carried by the protruding shaft 366 of the telemetric receiving instrument 350. The hub 357 is prevented from turning on the shaft by means of a set screw 358 and the dial 312 is fastened to the hub by means of a flange 359 and screws 360.

The outer end of the shaft 366 is formed with a gear portion 371 which cooperates with the flag and pointer mechanism generally designated 373 in exactly the same way as the gear 71 cooperates with the flag and pointer mechanism 73 of the instrument shown in Figures 3 and 7. The annular drum member 341 of the housing is provided at its upper portion with an opening 320' which is normally closed by a screw plug 321'. This opening is provided for setting the instrument if it should become out of phase with the transmitter, which may occur due to an interruption in the electrical current supply, as explained above.

The electrical connections 360 of the telemetric receiver instrument 350 are carried to a terminal block 361 mounted within the instrument, to which may be connected a plurality of wires 362 which are connected to the corresponding wires of terminal block 363 of the telemetric transmitting instrument 336.

When the telemetric instrument system of Figures 9 and 10 is originally installed, the magnetic coupling 290 of the transmitter instrument shown in Figure 9 is aligned as previously indicated. Then with the power connections to the transmitter instrument and receiver instrument opened so that no power is supplied to the instrument the dial 312 of the receiving instrument is turned until the pointer 382 of the receiver instrument is in a position corresponding to the position of the pointer 282 of the transmitter instrument. The circuit supplying electrical power to the receiver and transmitters 336 and 350 is then closed and the instruments will remain in the corresponding angular positions and the receiver dial 312 will be moved in synchronism with the transmitter as the dial 212 is moved in accordance with changes in liquid level.

The dial 312 of the receiver instrument shown in Figure 10 is made sufficiently thin that the period of vibration of the receiver instrument shown in Figure 10 is relatively low so that the receiver does not oscillate for an appreciable time when the position of the transmitter instrument is changed abruptly.

It will be noted that in the transmitter instrument shown in Figure 9 that the diameter of drum 260 upon which the displacement member supporting wire is wound is such that the dial 212, drum 260, the associated magnetic coupling 290 and telemetric transmitter 336 all move in unison a plurality of revolutions when the displacement member moves with the liquid level from the low liquid level to the high liquid level position. The liquid level indication is upon a scale of the same order and magnitude as the change of liquid level occurring and the indication is transmitted without angular diminution to the receiving instrument which accordingly reproduces a liquid level indication upon a scale equal to that of the transmitter instrument, that is to say, upon a scale which is of the same order and magnitude as the range of liquid level operated upon. The scale of fractional units adjacent pointer 387 of the receiver instrument is identical with that adjacent the pointer 87 of Figure 3 and there is accordingly reproduced at a distant point, a liquid level indication upon a scale which is greater in length than the corresponding units of liquid level change.

As shown in Figure 1 the gauging instrument 10 is mounted to be operated by the displacement member wire 13 which is strung vertically above the instrument to pulleys 14—14 to the displacement member 15 within the tank 30. The instrument 10 is also provided with a second boss 50' on the annular ring member 41 of the housing. As shown in Figure 1 the counter-weight casing 10 is connected to boss 50; the other boss 50' being plugged. If desired the annular ring portion 41 of the housing may be placed in a position 180 degrees rotated from that shown in Figure 1, when it is desired to have the wire 13 lead directly downward to the displacement member 15 of a tank. When thus oriented the whole instrument would be located directly over the tank being gauged.

Displacement member 15 of Figure 1, which is illustrated in detail in Figure 6 comprises a boat-shaped object which is preferably composed of metal having a specific gravity greater than the specific gravity of the liquid being gauged. The member 15 is provided with a pivoted coupling 9 by which it is attached to the wire 13. The base of the displacement member is provided with a keel-like protuberance 8 at one end and the opposite end is shaped so that the member 15 will have a minimum resistance to the flow of liquids about it. The position of pivoted coupling 9 on the displacement member is such that the member will remain substantially level when suspended in the liquid. Other shapes of the displacement member may obviously be used, the criterion being to choose a shape and balance which reduces the head resistance of the member to a fluid flowing about it.

Figs. 1 and 6 show the suspension member 13 attached by swiveled connection 9 to the displacement member 15 at a point permitting the major part of the transverse projected area of the displacement member 15 to come at the left of the suspension member attachment 9. In other words, in referring to the suspension member 13, as a vertical axis about which the displacement member 15 may rotate, unbalanced areas of the displacement member 15 are presented to the action of currents or motion of the liquid in which it is suspended.

The weight of counter-balance 17 produces a torque upon the drum 60 of the instrument which in part supports the displacement member 15, the remaining support of the member being supplied by the buoyant force of the liquid about it. The weight of the displacement member 15 upon wire 13 is sufficient to keep the wire 13 substantially vertical and the shape of member 15 is such that it will be headed into the stream flow of the liquid in the tank, if flow should occur. The combined effect of the weight of the displacement member 15 which keeps the wire 13 substantially vertical, and its shape, obviates the necessity of guides within the tank even though the liquid may move past the member 15 with fair velocity. Currents are set up during the filling or emptying of tanks and convection currents practically always exist due to heating and cooling of the tank with daily temperature changes. The liquid level measuring device of the present invention is thus capable of accurately measuring the level even during filling and emptying of the tank. This is not possible when the displacement member is guided upon rods and wires since side forces of the displacement member sets up frictional forces on the guides, which seriously impair the sensitivity of such instruments.

When a displacement member is used which has a greater specific gravity than that of the liquid in which it operates, the system is self-compensating and self-indicative of derangement. In float type displacement members a leaky float may still operate but the actuation of the instrument will be inaccurate and insensitive. No such trouble can be encountered with the preferred displacement member of this invention. If incrustation of the displacement member with substances having a specific gravity greater than the liquid should occur to an extent sufficient to overweight the displacement member it will sink and by the limiting indication "Empty," suggest derangement. Similarly, if the wire 13 should break the instrument will indicate "Full" and likewise suggest derangement, since the limiting conditions are not usual.

For installation in exceptionally quiet tanks it is sometimes permissible to provide a float-type displacement member, that is to say, one having a lesser weight than buoyance. Such floats which may be shaped so as to be freely movable to resist any slight currents occurring in the tank or may be shaped in the form of a cylinder, as shown in Figure 1A when the liquid is viscid and immobile.

Figure 14:
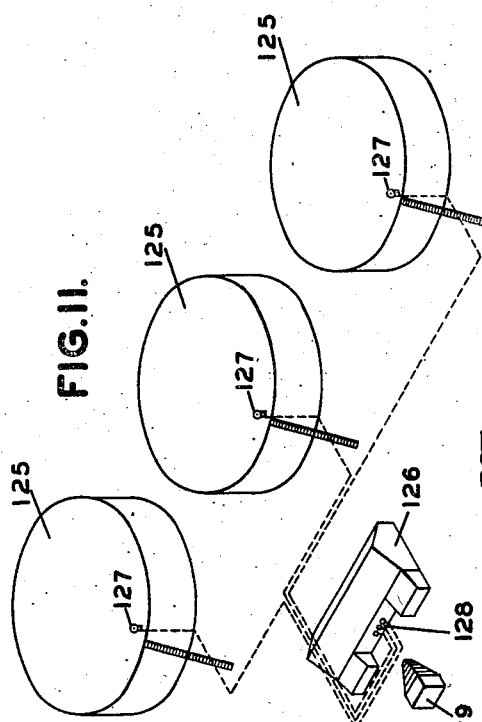
Figure 14 is a schematic partial view in elevation showing a modified form of the counter-weight mechanism.

Figure 14 illustrates a modification of the winding drum in which the weight of the suspension wire 13 is compensated by a variable diameter of the winding drum 65 of the counter-weight. In this modification the winding drum for the suspension wire 13 of displacement member 15 is of constant diameter, whereas the winding drum 65 for the suspension cable of counter-weight 17 is shaped so that the winding radius increases as the counter-weight 17 is lifted. The restoring torque thus produced by the counter-weight increases as an increased length of cable 13 is unwound.

Figure 15 illustrates a second modification of the counter-weight winding mechanism. In this instance the counter-weight 17 is suspended by a tape 32 which winds upon itself as the counter-weight is raised. The thickness of tape 32 thus increases the winding radius of the counter-weight drum 65 as each additional turn is made, with the result that as the counter-weight is raised an increasing restoring torque is produced upon shaft 66.

Where the suspension wire 13 is relatively fine and the total weight of the displacement member 15 is large the effect of the weight of the suspension wire is negligible and the compensating arrangements of Figures 1, 14 and 15 may permissibly be disregarded, but for displacement members of comparatively small weight, and for deep tanks particularly, the counter-weight compensation is desirable.

In some instances it is desirable to load the displacement member 15 with high specific gravity metal, or to make it especially heavy, so as to increase the vertical stability of the suspension member 13. When this increased weight reaches the permissible maximum of the instrument bearing loading it may be directly counter-balanced by attaching a weight to the portion of wire 13 within tube 2 of the conduit. A portion of the displacement member weight is thus taken by the bearings of pulleys 14—14, which are preferably anti-friction ball bearings of the type used in the instrument.

It is preferable to interpose a spring 33 between the counter-weight supporting cable and the counter-weight 17 within housing 20. This has the desirable effect of reducing the total mass of the units solidly interconnected in the system, and enables the displacement member 15, the attached wire 13, drum 60 and dial 12 to respond to a slight rapid liquid level change without at the same time initially moving counter-weight 17 which has a large mass. The instrument is thus responsive to slight "shock" disturbances of minute character such as ripples and by moving in response to such slight disturbances is apparently put in a dynamic state which enables it more readily to respond to slow changes of small magnitude of the average liquid level. Where a direct counter-balance is used within conduit 2, this may also for a similar reason be attached to the wire 13 through a spring suspension, as shown in the detail Figure 16.

Figure 11 illustrates the manner in which the telemetric system of Figures 9 and 10 may be installed for the indication at a centralized point of the liquid levels in a plurality of tanks. The installation shown in this figure may for instance represent that at a pipe line pumping station, or in an oil refinery pump house. Three tanks 125, and a pump house 126 are illustrated, although obviously the system may be installed in any number of tanks. A transmitter 127 of the type shown in Figure 9 is installed at the top or along side of each of the tanks 125 and a cable of electric conductors from each transmitter is carried to a central point in the pump house 126 to which are installed three telemetric receiving instruments 128 of the type shown in Figure 10. If desired a photographic recording apparatus 129 may be used in conjunction with the telemetric receiving instruments so that a permanent record may be kept of the readings of one or all of the instruments 128. The photographic apparatus 129 may be of any desired type capable of operation intermittently or periodically. If desired a clock (not illustrated) may be included in the field of view of the photographic apparatus 129 so that the readings of instruments 128 and time are simultaneously recorded photographically.

In Figures 12 and 13 there is illustrated a type of instrument which is especially adapted for use with underground tanks. The instrument comprises a horizontal casing 400 which has a removable cover 401 attached to the casing by means of screws 402. The cover 401 is provided with a window opening 403 which is preferably covered with a glass 404 and a hinged protective lid 405. This lid may, if desired, be provided with a hasp 406 so that it may be locked. At one corner of the housing 400 a recess 410 is provided to which a pipe 411 which communicates with the underground tank is connected. Within the recess are a plurality of pulleys 412 and 413 over which the displacement member wire 414 and counter-weight wire 415 are adapted to operate. A counter-weight is shown at 416.

The instrument mechanism is mounted upon an upwardly pivotable carrying frame comprising top and bottom cross pieces 420 and 421 which are attached to pivot bars 422 and 423 by means of screws 424. The bars 422 and 423 are pivoted to casing 400 by means of screws 425 so that the entire instrument may be pivoted upward for inspection or repair. An instrument shaft 430 is journaled in cross-bars 420 and 421 and carries a winding drum 431 for the displacement member wire 414 and a winding drum 432 for the counter-weight wire 415.

The upper end of the instrument shaft 430 is provided with a gear portion 438 which operates a rack bar 439. Bar 439 is positioned in a transverse groove 440 in the underside of upper crossbar 420. A protruding hub 441 on the upper side of winding drum 431 serves to retain the rack bar in the groove 440. A pointer 445 is provided at one end of the rack bar 439 and a pin 446 at the other end, which serve to limit the movement of the rack bar if the winding drum should be moved beyond the normal range of the instrument.

The upper face of winding drum 431 is provided with a dial 450 upon which a plurality of indicia are arranged into the form of a spiral. The spiral is the line defined upon the dial by pointer 445 as the winding drum 431 and dial 450 rotate and the pointer 445 is moved transversely from the low liquid level position of the instrument to the high liquid level position.

The displacement member used in conjunction with the indicating instrument shown in Figures 12 and 13 may be of any of the types heretofore described, but is preferably of a type having a dimension sufficiently small that it may be lowered through the pipe 411 into the underground tank. It will be noted that the counter-weight 416 operates within the pipe 411 and that the wire 414 to the displacement member is arranged with respect to the counter-weight so that each moves freely within the pipe 411.

The operation of this modification of the instrument is as follows: As the liquid level is raised the displacement member rises and the wire 414 is wound upon the winding drum 431 due to the torque developed by the counter-weight 416 attached by cable 415 to winding drum 432. The length of the spiral on dial 450 is of the same order and magnitude as the distance between the low and high level positions and the scale divisions on the spiral are accordingly of the same order and magnitude as the liquid level changes which they denote. As the liquid level is lowered drum 431 unwinds the suspension wire 414 and pointer 445 is moved proportionately toward the shaft 430. The result is pointer 445 is always in juxtaposition to the spiral of liquid level indicia markings corresponding to the particular liquid level existing in the tank and the exact liquid level is indicated by the indicia on the spiral most adjacent the pointer 445.

I claim as my invention:

1. A device for accurately measuring and indicating the level of a body of liquid having a surface movement with reference to the measuring apparatus comprising a suspension member, a boat-shaped displacement member attached to said suspension member, said displacement member having a buoyancy in the liquid of less than its weight and means including a rotative indicator member driven by said suspension member, and torque means connected to said means for producing a torque thereon in opposition to the rotative torque produced by said suspended displacement member and in an amount sufficient to maintain said displacement member only partly submerged in said liquid.

2. A liquid level responsive device which is capable of responding to slight changes in the mean liquid level of a body of liquid in which there are small oscillatory liquid level changes above and below said mean, which device is maintained in a dynamic condition by said oscillatory changes whereby the effect of static friction is minimized, comprising a winding drum means, a pulley mounted above said drum, a flexible suspension means connected to said drum means to be wound thereon and passed upwardly over said pulley and downwardly to said liquid body, a displacement means attached to said flexible means and suspended at the surface of said liquid, a direct counter-weight attached to said flexible means between the drum and pulley, a second winding means of lesser diameter than said drum means formed so as to be rotated with said drum means, a cable laid on said winding means so as to be wound when the flexible suspension is unwound, and a second counter-weight suspended on said cable.

3. A sensitive device for accurately measuring minute changes in the surface level of a body of liquid having varying surface currents comprising a boat-like displacement member, a freely rotatable sheave above said liquid body, a flexible suspension member arranged over said sheave and connected at one end to said displacement member so as to freely suspend the same at the surface of the liquid body, a counter-weight connected to another portion of the suspension member, a constant torque winding drum for reeling and unreeling the free end of said flexible member as the liquid level varies, and an indicator member driven thereby.

4. A sensitive device for accurately measuring minute changes in the surface level of a body of liquid comprising a winding drum means, a pulley mounted above said drum, a flexible suspension means connected to said drum means to be wound thereon and passed upwardly over said pulley and downwardly to said liquid body, a displacement means attached to said flexible means and suspended at the surface of said liquid, said displacement means having a specific gravity greater than said liquid in which it is suspended, a spring attached to said flexible means between the drum and pulley, a direct counter-weight attached to said spring, torque means connected to said drum means for maintaining winding tension on said flexible means, and an indicator driven by said drum means.

5. A sensitive device for accurately measuring minute changes in the surface level of a body of liquid comprising a winding drum means, a pulley mounted above said winding drum means, a flexible suspension means connected to said drum means to be wound thereon and passed upwardly over said pulley and downwardly to said liquid body, a displacement means attached to said flexible means and suspended at the surface of said liquid, said displacement means having a specific gravity greater than said liquid in which it is suspended, a spring attached to said flexible means between the drum and pulley, a direct counter-weight attached to said spring, a second winding means of lesser diameter than said drum means formed so as to be rotated with said drum means, a cable laid on said second winding means so as to be wound when the flexible suspension means is unwound, a spring attached to said cable, and a second counter-weight attached to said spring.

6. A device for accurately responding to changes in the level of a body of liquid having a surface movement with reference to the device comprising a flexible suspension member, a boat-shaped displacement member attached intermediate its ends to said suspension member, said displacement member being formed with a fin for positioning said displacement member substantially parallel with the direction of movement of the liquid.

7. A telemetric system for remotely reproducing a rotary motion which is accurately proportioned to slight changes in the mean liquid level of a body of liquid in which the instantaneous liquid level oscillates above and below said mean level which system includes means having rotatable parts which are maintained in a dynamic condition by said oscillatory changes whereby the effect of static friction is minimized comprising a displacement member, flexible means for suspending said displacement member at the surface of said body of liquid, means for maintaining said flexible means under constant tension as the liquid level varies including a rotatable winding means for said flexible means, a second winding means formed for movement with said first winding means, a second flexible means laid thereon so as to be wound when said first flexible means is unwound, a counter-weight suspended by said second flexible means and a spring coupling between said counter-weight and second flexible means, a rotary electrical telemetric transmitter coupled to said rotatable winding means which is maintained in a dynamic condition whereby said transmitter is maintained in a dynamic condition, and a remotely located electric telemetric receiver electrically connected to said electric telemetric transmitter.

8. A liquid level responsive device which is capable of responding to slight changes in the mean liquid level of a body of liquid in which there are small oscillatory liquid level changes above and below said mean, which device is maintained in a dynamic condition by said oscillatory changes, whereby the effect of static friction is minimized, comprising a displacement member, flexible means for suspending said displacement member at the surface of said body of liquid, means for maintaining said flexible means under constant tension as the liquid level varies, including a winding means for said flexible means, a second winding means formed for movement with said first winding means, a second flexible means laid thereon so as to be wound when said first flexible means is unwound, a counter-weight suspended by said second flexible means, and a spring coupling between said counter-weight and second flexible means, said spring being sufficiently resilient to permit the winding means, flexible means and displacement member to move under the influence of said small oscillatory liquid level changes.

9. A liquid level responsive device which is capable of responding to slight changes in the mean liquid level in a body of liquid in which there are small oscillatory liquid level changes above and below said mean, which device is maintained in a dynamic condition by said oscillatory changes, whereby the effect of static friction is minimized, comprising a displacement member, flexible means for suspending said displacement member at the surface of said body of liquid, means for maintaining said flexible means under constant tension as the liquid level varies, including a first winding drum for said flexible means, a second winding drum of smaller diameter than said first winding drum formed for rotation with said first winding drum, a second flexible means laid thereon so as to be wound when said first flexible means is unwound, a counter-weight suspended by said second flexible means, and a spring coupling between said counter-weight and second flexible means, said spring being sufficiently resilient to permit the winding drums, flexible means and displacement member to move under the influence of said small oscillatory liquid level changes.

10. A liquid level device which is capable of responding to slight changes in the mean liquid level of a body of liquid in which there are small oscillatory liquid level changes above and below said mean, which device is maintained in dynamic condition by said oscillatory changes, whereby the effect of static friction is minimized, comprising a displacement member having a weight greater than its buoyancy in said liquid, means for freely suspending said displacement member in said liquid and for maintaining said member only partly submerged, including a flexible means, a winding drum for said flexible means, a second drum of smaller diameter than said first drum mounted for rotation with said first drum, a second flexible means laid on said second drum so as to be unwound as the first flexible means is wound, a counter-weight freely suspended by said second flexible means, and a spring coupling between said counter-weight and second flexible means, said spring being sufficiently resilient to permit the winding drums, flexible means, and displacement member to move under the influence of said small oscillatory liquid level changes.

11. A device for accurately measuring and indicating the level of a body of liquid having a surface movement with reference to the measuring apparatus comprising a suspension member, a boat-shaped displacement member attached to said suspension member, means including a rotative indicator member driven by said suspension member, and torque means connected to said means for producing a torque thereon in opposition to the rotative torque produced by said suspended displacement member and in an amount sufficient to maintain said displacement member only partly submerged in said liquid.

12. A sensitive device for accurately measuring minute changes in the surface level of a body of liquid having varying surface currents comprising a boat-shaped displacement member, a freely rotatable sheave above said liquid body, a flexible suspension member arranged over said sheave and connected at one end to said displacement member so as to freely suspend the same at the surface of the liquid body, a constant torque winding drum for reeling and unreeling the free end of said flexible member as the liquid level varies, and an indicator member driven thereby.

13. A telemetric system for remotely reproducing a rotary motion which is accurately proportioned to slight changes in the mean liquid level of a body of liquid in which the instantaneous liquid level oscillates above and below said mean level which system includes means having parts which are maintained in a dynamic condition by said oscillatory changes whereby the effect of static friction is minimized comprising a displacement member, flexible means for suspending said displacement member at the surface of said body of liquid, a rotatable winding drum for said flexible means, torque means for rotating said winding drum to wind said flexible means thereon, said torque means including a spring capable of being deflected by forces induced by said instantaneous liquid level oscillations, which spring is interposed in said torque means so as to transmit torque forces whereby said rotatable winding means is maintained in a dynamic condition by said forces, a rotary electrical telemetric transmitter coupled to said rotatable winding device which is maintained in said dynamic condition whereby said transmitter is maintained in a dynamic condition, and a remotely located electric telemetric receiver electrically connected to said electric telemetric transmitter.

14. A device for responding to changes in the level of a body of liquid having a surface movement with reference to said device comprising a flexible suspension member, a single displacement member attached to said suspension member, said displacement member being a relatively long, relatively narrow body, said point of attachment being positioned intermediate the ends of the displacement member so that a major part of the transverse projected area longitudinally of the submerged portions of said displacement member is at one side of said suspension member, whereby the displacement member will assume a position with its axis substantially parallel with the direction of liquid movement when liquid moves relative thereto.

15. A device for responding to changes in the level of a body of liquid having a surface movement with reference to the device comprising a flexible suspension member, and a boat-shaped displacement member attached intermediate its ends to said suspension member, said displacement member having a specific gravity greater than that of the liquid in which it is suspended, said displacement member being formed with a fin for positioning said member substantially parallel with the direction of movement of the liquid, and means for applying an upward force on said suspension member in an amount sufficient to maintain said displacement member only partly submerged.

CHARLES A. LANG.